US012250229B2

(12) United States Patent
Noon et al.

(10) Patent No.: US 12,250,229 B2
(45) Date of Patent: *Mar. 11, 2025

(54) SECURE COMMUNICATIONS SERVICE FOR INTERCEPTING SUSPICIOUS MESSAGES AND PERFORMING BACKCHANNEL VERIFICATION THEREON

(71) Applicant: Material Security Inc., San Jose, CA (US)

(72) Inventors: Ryan M. Noon, Mountain View, CA (US); Abhishek Agrawal, San Francisco, CA (US); Christopher J. Park, San Jose, CA (US)

(73) Assignee: Material Security Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,970

(22) Filed: Jul. 12, 2023

(65) Prior Publication Data

US 2023/0353581 A1 Nov. 2, 2023

Related U.S. Application Data

(63) Continuation of application No. 17/501,414, filed on Oct. 14, 2021, now Pat. No. 11,785,019, which is a
(Continued)

(51) Int. Cl.
*H04L 29/06* (2006.01)
*G06F 18/22* (2023.01)
(Continued)

(52) U.S. Cl.
CPC ............ *H04L 63/126* (2013.01); *G06F 18/22* (2023.01); *H04L 51/212* (2022.05); *H04L 63/1483* (2013.01); *H04L 63/18* (2013.01)

(58) Field of Classification Search
CPC ... H04L 63/1483; H04L 51/212; H04L 51/12; H04L 51/00; H04L 63/126; H04L 63/18; G06K 9/6215; G06F 18/22
See application file for complete search history.

(56) References Cited

U.S. PATENT DOCUMENTS 8,935,768 B1 1/2015 Tyree
9,268,958 B1 2/2016 Kessler
(Continued)

FOREIGN PATENT DOCUMENTS

CN 101495969 B 10/2012
CN 108985769 A 12/2018
(Continued)

OTHER PUBLICATIONS

Extended European Search Report, European Patent Office Application No. EP18832232.5, Jun. 10, 2021, 12 pages.
(Continued)

*Primary Examiner* — Yogesh Paliwal
(74) *Attorney, Agent, or Firm* — Fenwick & West LLP

(57) ABSTRACT

A system and a method are disclosed for verifying a suspicious electronic communication. To this end, a secure communications service may detect an electronic communication comprising an identifier of a purported originator of the electronic communication and an identifier of an intended recipient, and determine that an attribute of the electronic communication corresponds to a suspicious attribute. Responsively, the service may intercept the electronic communication and storing the electronic communication in purgatory memory, so as to prevent the electronic communication from being populated in a private repository of the intended recipient, transmit a verification message, and receive a reply to the verification message that verifies the authenticity of the electronic communication. In response to receiving the reply, the service may release the electronic
(Continued)

communication from the purgatory memory, so as to cause the electronic communication to be populated in the private repository of the intended recipient.

20 Claims, 11 Drawing Sheets

Related U.S. Application Data continuation of application No. 16/525,382, filed on Jul. 29, 2019, now Pat. No. 11,178,178.

(51) Int. Cl.
*H04L 9/40* (2022.01)
*H04L 51/212* (2022.01)

(56) References Cited

U.S. PATENT DOCUMENTS

| | | |
|---|---|---|
| 2005/0138353 A1 | 6/2005 | Spies et al. |
| 2006/0075228 A1 | 4/2006 | Black et al. |
| 2006/0095966 A1* | 5/2006 | Park .................. H04L 63/0263 713/188 |
| 2007/0005715 A1 | 1/2007 | LeVasseur et al. |
| 2007/0079379 A1 | 4/2007 | Sprosts et al. |
| 2008/0192757 A1 | 8/2008 | Hirchson |
| 2009/0089859 A1 | 4/2009 | Cook et al. |
| 2012/0240238 A1 | 9/2012 | Gates et al. |
| 2015/0082391 A1 | 3/2015 | Lerman et al. |
| 2015/0205965 A1 | 7/2015 | Kilgallon et al. |
| 2015/0310201 A1 | 10/2015 | Sugiyama et al. |
| 2016/0210602 A1 | 7/2016 | Siddique et al. |
| 2016/0352695 A1 | 12/2016 | Kozolchyk et al. |
| 2017/0111325 A1 | 4/2017 | Maller et al. |
| 2017/0243028 A1 | 8/2017 | LaFever et al. |
| 2017/0256008 A1 | 9/2017 | Hara |
| 2018/0241853 A1 | 8/2018 | Katmor et al. |
| 2018/0351929 A1 | 12/2018 | Kohli |
| 2019/0182342 A1 | 6/2019 | Goenka et al. |
| 2019/0199745 A1* | 6/2019 | Jakobsson ........... H04L 63/1483 |

FOREIGN PATENT DOCUMENTS

| | | |
|---|---|---|
| WO | WO 2015/112495 A1 | 7/2015 |
| WO | WO 2017/190436 A1 | 9/2017 |

OTHER PUBLICATIONS

Extended European Search Report, European Patent Office Application No. EP20847724.0, Aug. 2, 2023, 12 pages.
International Search Report and Written Opinion, PCT Application No. PCT/US2018/041897, Nov. 20, 2018, 10 pages.
International Search Report and Written Opinion, PCT Application No. PCT/US2020/042043, Oct. 1, 2020, 21 pages.
United States Office Action, U.S. Appl. No. 16/525,382, filed Mar. 22, 2021, 12 pages.
United States Office Action, U.S. Appl. No. 17/501,414, filed Jan. 20, 2023, 7 pages.

* cited by examiner

| Key Value Store ||
|---|---|
| Key | Value |
| [HID, Account ID, Host] | {Headers, tags, hostMsgID, lastLockStubID, lastNATOStub, lastLockAnalysis, LastRemediation, CaseAssigned, leaseID, SensitiveMark, SuspiciousMark, PurgatoryCause, PurgatoryStatus, ...} |
| Key 2 | Values |
| ... | ... |

SECURE COMMUNICATIONS SERVICE FOR INTERCEPTING SUSPICIOUS MESSAGES AND PERFORMING BACKCHANNEL VERIFICATION THEREON

CROSS REFERENCE TO RELATED APPLICATIONS

This application is a continuation of U.S. patent application Ser. No. 17/501,414, filed Oct. 14, 2021, which is a continuation of Ser. No. 16/525,382, filed Jul. 29, 2019, which is related to U.S. patent application Ser. No. 16/034,199, filed Jul. 12, 2018, and titled "Systems and Methods for Protecting Contents and Accounts", the contents of which are hereby incorporated by reference.

TECHNICAL FIELD

The disclosure generally relates to the field of secure electronic communications, and more particularly relates to identifying and intercepting suspicious electronic communications to verify their authenticity.

BACKGROUND

Phishing has become a common scheme in today's increasingly electronic world, where malicious users attempt to fool people into taking action to their detriment (e.g., clicking a link that leads to a malware download; handing over a password that unlocks a financial portal, etc.). Related art implementations set up filters to automatically detect phishing e-mails based on detectable characteristics (e.g., e-mails from an unknown domain, e-mails with content matching a particular pattern, etc.). However, when the filters are matched by incoming e-mails, the e-mails are either quarantined subject to administrator approval, leaving the intended recipient helpless to assess whether the e-mail was not a phishing email after all, or are stored in a spam folder that a user is unlikely to see, and may be harmed by if the user attempts to access the e-mail from the spam folder.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates one embodiment of a key value table for managing electronic files and their attributes, including their being suspicious or non-suspicious.

DETAILED DESCRIPTION

Figure 1:
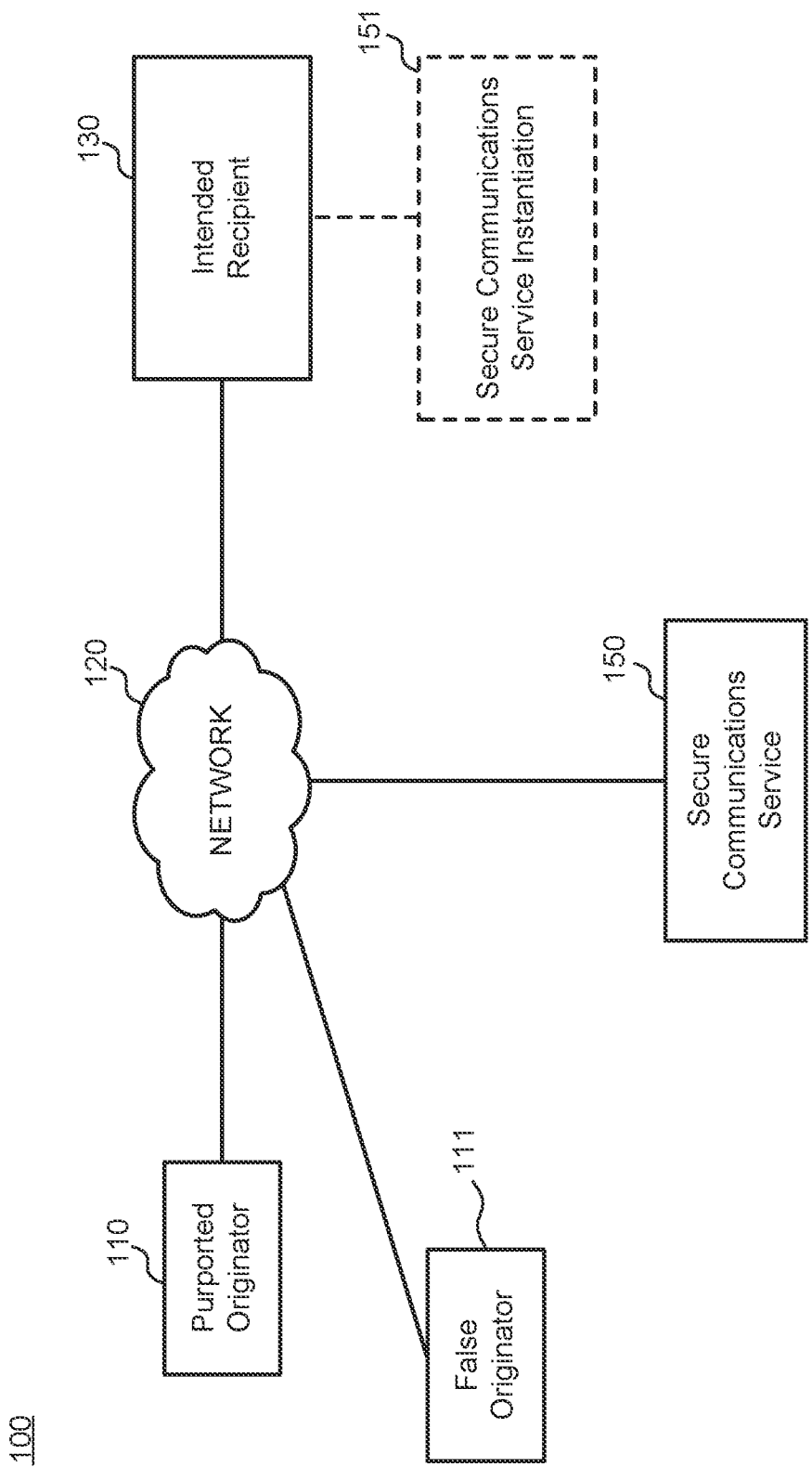
FIG. 1 illustrates one embodiment of a system environment including infrastructure for detecting and intercepting suspicious communications.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a process for identifying and intercepting suspicious electronic communications before they reach a private repository of an intended recipient. Based on the contents of the message, either the intended recipient, the purported sender, or the actual sender of the electronic communication may be prompted to indicate information to validate the electronic communication. For example, if a suspicious e-mail is a password reset request, the intended recipient may be prompted, via a push notification on his mobile device, to verify whether a password reset has been attempted, in which case the e-mail would be released. As another example, if the suspicious e-mail is a wire transfer request that is purported to be from a bank, a trusted address of the bank may be contacted to verify that the wire transfer request is authentic.

To this end and others, systems and methods are disclosed herein for verifying a suspicious electronic communication. In an embodiment, a secure communications service detects an electronic communication comprising an identifier of a purported originator of the electronic communication and an identifier of an intended recipient. The secure communications service determines whether an attribute of the electronic communication corresponds to a suspicious attribute. In response to determining that the attribute of the electronic communication corresponds to the suspicious attribute, the secure communications service intercepts the electronic communication and stores the electronic communication in a purgatory memory. This may allow for prevention of the electronic communication from being populated in a private repository of the intended recipient. The secure communications service transmits a verification message, receives a reply to the verification message that verifies the authenticity of the electronic communication, and, in response to receiving the reply, releases the electronic communication from the purgatory memory. This may allow for the electronic communication to be populated in the private repository of the intended recipient.

Secure Communications System Environment

FIG. 1 illustrates one embodiment of a system environment including infrastructure for detecting and intercepting suspicious communications. FIG. 1 depicts environment 100, which includes purported originator 110, false originator 111, network 120, intended recipient 130, secure communications service 150, and secure communications service instantiation 151. As will be described below, in particular with respect to the data flow of FIG. 8, a message that appears to be from purported originator 110 is transmitted over network 120, with a destination address of a private repository of intended recipient 130.

Purported originator 110 may or may not be the actual originator of the message. Where purported originator 110 is not the actual originator of the message, the message actually originates from false originator 111, which is an entity that has spoofed a source identifier of the message to appear to be from purported originator 110, rather than from false originator 111. The contents of the term "message" as used herein are generally referred to in the context of an "electronic communication" (e.g., e-mail, simple messaging service (SMS), etc.); however, the contents of a message sent over environment 100 may be any type of file (e.g., a .doc file, a .pdf file, or any other type of file), even if the file itself is not a communication. The term message is used interchangeably with the term electronic communication.

Prior to reaching the private repository of intended recipient 130, secure communications service 150 and/or secure communications service instantiation 151 examines the message, and determines whether an attribute of the message corresponds to a suspicious attribute. If the attribute of the message corresponds to a suspicious attribute, secure communications service 150 and/or secure communications service instantiation 151 intercepts the message. Secure communications service 150 is a service configured to detect a suspicious message, intercept the message, authenticate the message, and release the message to a private repository if the message is authenticated. Secure communications service instantiation 151 is an instantiation of secure communications service 150 that is local to intended recipient 130, or placed logically, or physically, between network 120 and intended recipient 130. Where secure communications service 150 is referred to herein, secure communications service instantiation 151 is equally applicable. For convenience, the term private repository as used herein is primarily referenced as an e-mail inbox. However, the term private repository may refer to a repository of any type of electronic communication (e.g., e-mail, SMS, etc.) or any type of file (e.g., a private repository of personal files, such as .doc and .pdf files). Moreover, while the term private repository primarily refers to a repository private to a particular individual or account, the term private repository may refer to any repository that is closed off to some potential users (e.g., a shared repository as defined by access permissions being granted to particular users, or being accessible by way of a password). Mechanics of determining whether a message is suspicious, interception of a message, and the like, are described below with respect to FIG. 2.

Secure Communication Service Architecture

Figure 2:
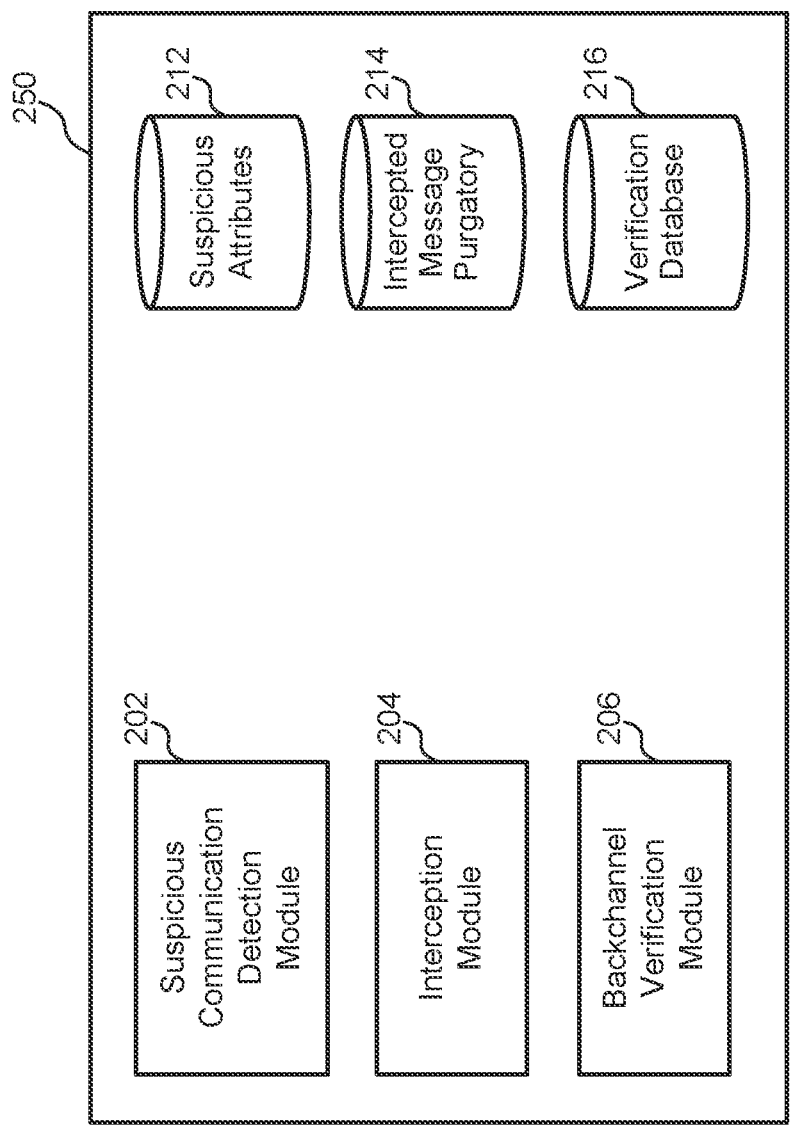
FIG. 2 illustrates one embodiment of exemplary modules and databases that are used by a secure communications service.

FIG. 2 illustrates one embodiment of exemplary modules and databases that are used by a secure communications service. Secure communications service 250 may include all functionality described above with respect to secure communications service 150. In one embodiment, secure communications service 250 may include a suspicious communication detection module 202, an interception module 204, a backchannel verification module 206, a suspicious attributes database 212, an intercepted message purgatory database 214, and a verification database 216. The modules may be embodied as functional program code (comprised of instructions) that may be stored on a storage device (e.g., memory) and may be executed by one or more processing devices (e.g., processor, controller, state machine). The modules and databases are further described herein.

Suspicious communication detection module 202 examines messages from an originator (e.g., purported originator 110 or false originator 111) that are addressed to an intended recipient (e.g., intended recipient 130), and determines whether the messages are suspicious. The term suspicious, as used herein, refers to a message having an attribute that is known to match a template or pattern that is predefined to be suspicious. For example, templates, patterns, and other suspicious attributes are stored in suspicious attributes database 212. The term attribute, as used herein, may be content or metadata of a message, including payload and header content. The templates in suspicious attributes database 212 may be organized into a template library that is indexed using any known indexing technique. Suspicious communication detection module 202 may, to determine whether a message is suspicious, determine whether content of the electronic communication matches a template of the template library. Responsive to determining that the content of the electronic communication matches a template of the library, suspicious communication detection module 202 may determine that the attribute of the message is suspicious.

In an embodiment, suspicious communication detection module 202 may determine that no template is fully matched, and may thus conclude that the message is not suspicious and may refrain from intercepting it, thus allowing it to pass to the private repository of the intended recipient. In another embodiment, suspicious communication detection module 202 may determine that one or more templates are partially matched by contents of the message, and may thus determine a degree to which the templates are matched. For example, a template may indicate that a message is to be considered suspicious if the message includes a request for funds, and if the message also originates from a financial institution from which the intended recipient has not previously dealt with. Suspicious communication detection module 202 may determine a partial match to the template where the message includes a request for funds, but the user has dealt with the purported financial institution that originated the request, albeit a threshold amount of time ago. Accordingly, suspicious communication detection module 202 may determine whether the message is suspicious based on whether the degree to which the message matches one or more templates exceeds a threshold. In this example, the degree is a 50% match, where one element is matched, and one is not. Thus, if the threshold is 50% or less, than the message would be determined to be suspicious by suspicious communication detection module 202.

In an embodiment, suspicious attribute database 212 may indicate that certain categories of messages are predefined to be suspicious, no matter what content is within those messages. A non-exhaustive list of exemplary categories that may be predefined to be suspicious includes messages that relate to password recovery, payment, account verification, affiliation verification, granting access privileges, and/or providing content. In such an embodiment, when suspicious communication detection module 202 encounters these messages and determines that they are predefined to be suspicious based on entries in suspicious attributes database 212, suspicious communication detection module 202 determines the messages to be suspicious without further analysis.

Interception module 204 intercepts messages traveling between a purported originator 110 or a false originator 111 and an intended recipient 130. The term intercept as used herein refers to preventing a message from traveling to a private repository of an intended recipient until such a time that the message is authenticated and released. Intercepted messages are stored in intercepted message purgatory 214. Intercepted message purgatory 214 is a database that is not accessible to intended recipient 130. Secure communications service 250 holds intercepted messages in intercepted message purgatory while the intercepted messages are evaluated for authenticity, and releases the intercepted messages from intercepted message purgatory 214 to the private repository of intended recipient 130 when the intercepted messages are deemed to be authentic.

Backchannel verification module 206 authenticates a message, or determines whether a message is not authenticated, based on backchannel communications with the purported originator, a false originator, and/or the intended recipient. The term backchannel communication as used herein refers to a secondary communication, beyond the initial message, that is used to verify the authenticity of the original message. For example, in the case of a password verification message being found suspicious, the backchannel communication may be a message to the intended recipient that prompts the user to select "yes" or "no" options in connection with a prompt that asks "are you trying to change your password?". Backchannel communications may be sent by backchannel verification module 206 to repositories other than the private repository to which the initial message was directed. For example, a backchannel communication may be a push notification or text message sent to the intended recipient's mobile device or other client device, or an e-mail sent to a different e-mail address. In an embodiment, backchannel verification module 206 may insert an alert into the private repository of the intended recipient a notification is awaiting attention by the intended recipient at the different client device or address. A backchannel communication is primarily described herein as a textual message, however, it may be any form of message, such as an audio message, a telephone call, a message embedded in an image, or any other form of communication.

Backchannel verification module 206 determines to whom backchannel communications (which are interchangeably referred to herein as verification messages) shall be sent based on entries of verification database 216. Verification database 216 includes entries that map attributes of messages (e.g., as determined by suspicious communication detection module 202) to actions that will be taken by backchannel verification module 206. For example, an entry may indicate that if an attribute of the message relates to password recovery, the verification message is to be sent to the intended recipient (e.g., but not a purported originator or a false originator). An administrator might have programmed verification database 216 to have such an entry because the intended recipient is in the best position, of the intended recipient, the purported originator, and a potential false originator, to know whether a password recovery message was requested from the purported originator. Other such messages might include account verification messages, affiliation verification messages, messages that request or grant access privileges, messages that provide content, and the like.

In an embodiment, backchannel verification module 206 determines that a verification message is to be sent to a purported originator. Backchannel verification module 206 may determine, based on additional entries of verification database 216, one or more trusted identifiers for a purported originator. Such entries of verification database 216 are used because the source identifier included in the message may be spoofed by a false originator. The trusted identifiers may be addresses (e.g., physical addresses, MAC addresses, IP addresses, etc.), or any other means of identification of a trusted identifier of a purported originator. Using the trusted identifier, backchannel verification module 206 transmits a verification message to the purported originator. The verification message may request confirmation that the purported originator requested transmission of the message.

In an embodiment, backchannel verification module 206 may cause a prompt to appear on a user interface from a source of the message. For example, if the message was received from false originator 111, a prompt may appear on a user interface from which the message was sent at false originator 111. The prompt may challenge false originator 111 to input information that would verify that false originator 111 is in fact purported originator 110. Further details of such a mechanism are discussed below with respect to FIGS. 7A-7B.

Whether backchannel verification module 206 transmits, or otherwise causes, verification messages to be transmitted to an intended recipient, a purported originator, or a false originator, the verification messages include means for the recipients to verify the authenticity of the message purported to originate from the purported originator to the intended recipient. In an embodiment, verification messages may include "yes" or "no" prompts, where selection of one of these prompts leads to authentication, and selection of the other leads to verification that the message is not authentic. In another embodiment, verification messages may include challenge questions or other prompts that require insertion of information into a field, or a reply to the verification message with information, where if the information matches known information, then the message is authenticated. For example, a challenge question for a purported financial transaction may request verification of a routing number either within a field of the verification message, or in a reply message to the verification message. Such verification options and other means are discussed below with respect to FIGS. 6A-6B and 7A-7B.

Figure 3:
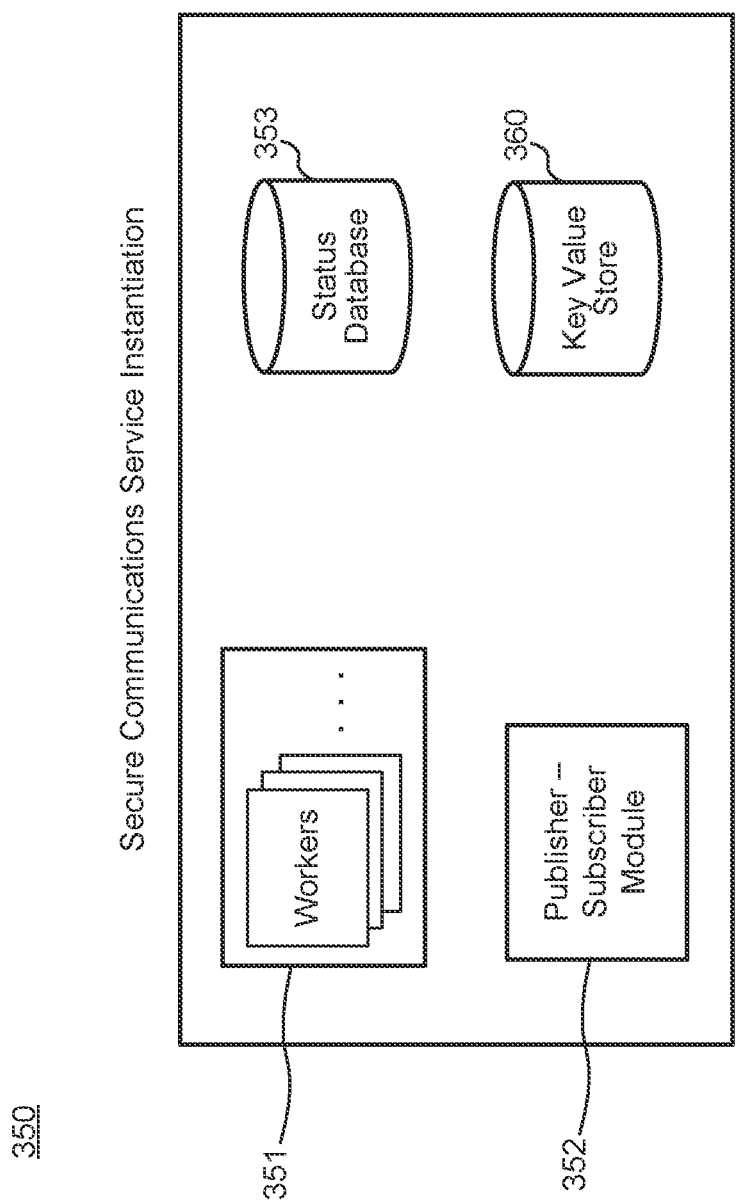
FIG. 3 illustrates one embodiment of an exemplary secure communications service instantiation.

FIG. 3 illustrates one embodiment of exemplary details of a secure communications service or a secure communications service instantiation. Secure communications service instantiation 350 may be an instantiation of secure communications service 150 that is specific to a particular user of environment 100 (e.g., intended recipient 130), or to a particular domain (e.g., the domain of intended recipient 130). While FIG. 3 is generally discussed with respect to secure communications service instantiation 350, the discussion of FIG. 3 is equally applicable to secure communications service 150. The term domain, as used herein, may refer to a distinct group, such as a distinct group of individuals, a distinct group of computing devices, or a combination thereof. The domain may be demarcated by a unique address feature (e.g., a common domain name in an e-mail address; a common set of symbols in an addressing scheme, etc.). A practical example of a domain is a company, where the company name is used as the domain name, and employees' e-mail addresses all include "@[companyname].com." In this example, secure communications service instantiation 350 may include workers 351, publisher-subscriber module 352, status database 353, and key value store 360. Secure communications service instantiation 350 includes a plurality of workers 351. Each worker of workers 351 has a dedicated task (e.g., fetch e-mail, modify e-mail, etc.). Having a plurality of workers 351 is advantageous because it enables secure communications service 150 to scale to enormous size, as each new task during scaling can be dedicated to its own new worker of workers 351.

To enable workers to recognize tasks and perform them, secure communications service instantiation 350 executes publisher-subscriber module 352. Publisher-subscriber module 352 publishes tasks that are to be performed by workers 351. Each published task includes an indication of a topic, along with instructions for the task itself. Each of workers 351 may subscribe to its own subscription topic, such that when publisher-subscriber module 352 publishes a task with a given topic, the correct worker recognizes and performs the task.

Status database 353 comprises a register of what accounts are subscribed to secure communications service instantiation 350 (e.g., a register of user accounts (e.g., user 1 and user 2 of domain 130)) and the status of those accounts and electronic communications and files corresponding to those accounts (e.g., electronic communications and/or files in private repository 131). Key value store 360 is a register that maps attributes of messages (e.g., message 190) of a private repository (e.g., private repository 131), and is relied upon by publisher-subscriber module 352, in connection with status database 353, to determine what tasks to publish. Key value store 360 is described in detail with reference to FIG. 4 below.

FIG. 4 illustrates one embodiment of a key value store for managing electronic files and their attributes, including their potential association with a phishing attempt. Key value store 460 contains the functionality described above with respect to key value store 360. Key value store 460 is a data structure comprising keys 461 and corresponding values 460. In an embodiment, the data structure is a hash map. In one embodiment, key value store 460 indicates the state of the world as secure communications service instantiation 350 knows it to be. If secure communications service instantiation 350 is reflecting the status of electronic communications hosted by a particular host, such as GOOGLE GMAIL, then key value store 460 is initialized based on message values originating from GMAIL. Key value store 460 is then updated as secure communications service instantiation 350 propagates changes to private repositories (e.g., of domain 130) to reflect updated states of the world.

Keys 461 may include a message identifier for each message. The message identifier may be a, for example, a tuple of a host identifier ("HID"), an account identifier ("Account ID"), and a host value. The HID is a standard value found in, e.g., RFC 2228 of the Internet Engineering Task Force (RFC 2228 refers to this value as "message-ID"), published in April 2001, a copy of which is submitted herewith and the disclosure of which is hereby incorporated by reference herein in its entirety. The account ID corresponds to a particular user (e.g., user 1 or user 2 as depicted in FIG. 1). The host may correspond to a particular provider. In the case of electronic communications such as e-mail, the host may correspond to Gmail or Outlook, which are e-mail access and management providers. In the case of electronic files generally, the host may correspond to DROPBOX or GOOGLE DRIVE, which are file access and management providers. It is noted that each key has corresponding values 462. The values depicted in FIG. 4 are merely exemplary and are non-exhaustive.

The headers of values 462 correspond to headers of a given electronic communication or file. The tags of values 462 are platform-neutral status identifiers for a given message. For example, state definitions on the Microsoft Outlook e-mail platform are different from state definitions on the Gmail platform. Secure communications service instantiation 350 may execute a normalization module to translate, based on known state identifiers, a given state to a platform neutral tag.

Host message identifier (HostMsgId) of values 462 corresponds to a message identifier for the given message that is assigned by the host. For example, if Gmail is the host, Gmail may assign an identifier to the message, and HostMsgId is used to create a correspondence between the key used in key value store 460 and the host's ID.

Last lock stub identifier (LastLockStubID) of values 462 indicates whether an electronic communication (or file) has been locked. The term locked, as used herein, refers to an electronic communication that has been rendered inaccessible to a user notwithstanding the electronic communication being within the user's private repository.

Last NATO stub (LastNATOStub) of values 462 indicates whether an electronic communication has been defanged (i.e., had threatening content or potentially threatening content, such as malware, either removed or identified to the user). The termed defanged is used interchangeably herein with the term "vaccinated," and generally refers to remedial action having been taken with respect to an electronic communication or a file, as described herein.

Last lock analysis (LastLockAnalysis) of values 462 indicates the reason why an electronic communication has been locked or unlocked. The term unlocked, as used herein, may refer to the re-enabling of access to an electronic communication that was previously locked. The lock reasons may indicate, e.g., that a particular user with a particular trust score flagged the message as threatening. The unlock reasons may indicate, for example, that the message has been vaccinated and thus is unlocked because it has been replaced with a vaccinated version.

Last remediation (LastRemediation) of values 462 indicates the particular vaccination used on an electronic communication or file.

Case assigned (CaseAssigned) of values 462 indicates a cluster to which an electronic communication has been assigned. The terms "case" and "cluster" are used interchangeably herein. Clusters will be described in further detail below with respect to FIG. 9.

Lease identifier (LeaseID) of values 462 indicates what node (i.e., worker of workers 351) has leased the ability to apply a change to values of a given key. In an embodiment, only one node can apply an action on a key at a time, and LeaseID ensures that only the currently leasing node can apply the action. LeaseID may indicate how long the lease is valid.

Sensitive mark (SensitiveMark) and suspicious mark (SuspiciousMark) of values 462 indicate whether a user has indicated that a message is sensitive, or suspicious, respectively.

Purgatory cause (PurgatoryCause) of values 462 indicate a reason why a message has been intercepted and put into a purgatory database. For example, PurgatoryCause may reflect one or more attributes that caused a message to be determined to be suspicious (which led to interception of the message).

Purgatory status (PurgatoryStatus) of values 462 indicates a status of a message in purgatory. The status may be that a verification message has not been sent, a verification message has been sent and a reply is pending, a reply has been received and the message is/is not to be released, and that the message is released.

The manner in which key value store 460 is updated and used to manage message content for various users is through applying differentials to known data. For example, key value store 460 indicates a state for every message of each known private repository. Thus, when a change is to be made, publisher-subscriber module 352 may publish a task as a particular change that is to be made (e.g., the marking of an e-mail as sensitive or suspicious when it was not previously marked as sensitive or suspicious) along with the indication of the key to which the change is to be made. The worker of workers 351 who subscribes to the topic corresponding to that task may lease the key (e.g., causing leaseID to update to indicate, e.g., the particular worker and the length of the lease). The worker may additionally command the change be made (e.g., command Gmail to mark the e-mail sensitive), and when the command is executed, the worker may make the change (e.g., change the value of SensitiveMark from 0 to 1).

In an embodiment, secure communications service instantiation 350 is item potent, which means that updates requested by publisher-subscriber module are kept present in case an update fails. For example, following the example above, if the host is GMAIL, and the update is to label an e-mail as suspicious, it would be impossible to make this update if GMAIL's servers are down and the e-mail is inaccessible. Thus, where secure communications service instantiation 350 is item potent, the update may be queued until GMAIL is again accessible, at which time the e-mail may be updated. The state change in key value store 460 would be withheld until the e-mail is updated.

Computing Machine Architecture

Figure 5:
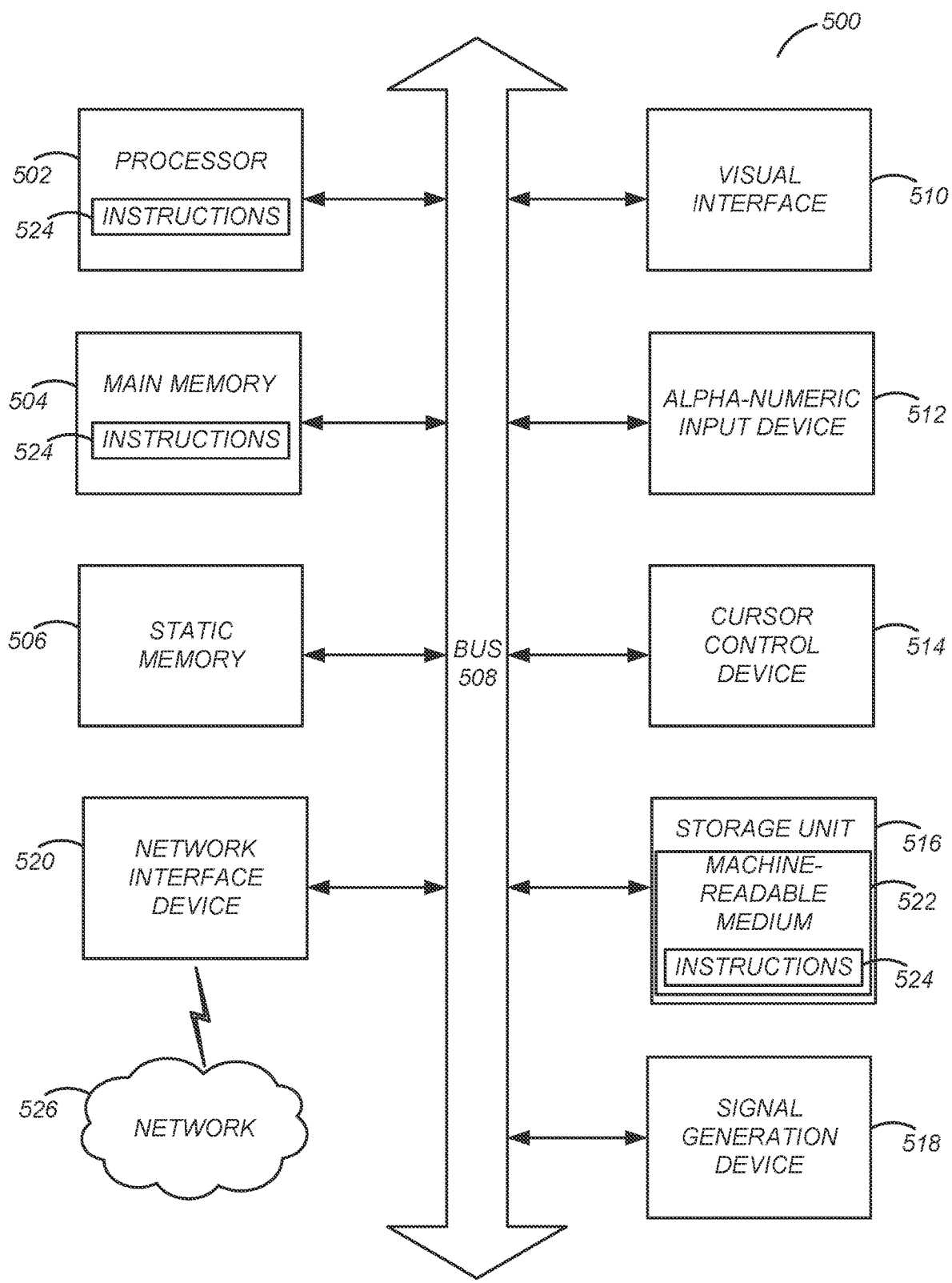
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller, or one or more of the same). Specifically, FIG. 5 shows a diagrammatic representation of a machine in the example form of a computer system 500 within which program code (e.g., software, including the modules described herein) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Exemplary Verification Messages

Figure 6A:
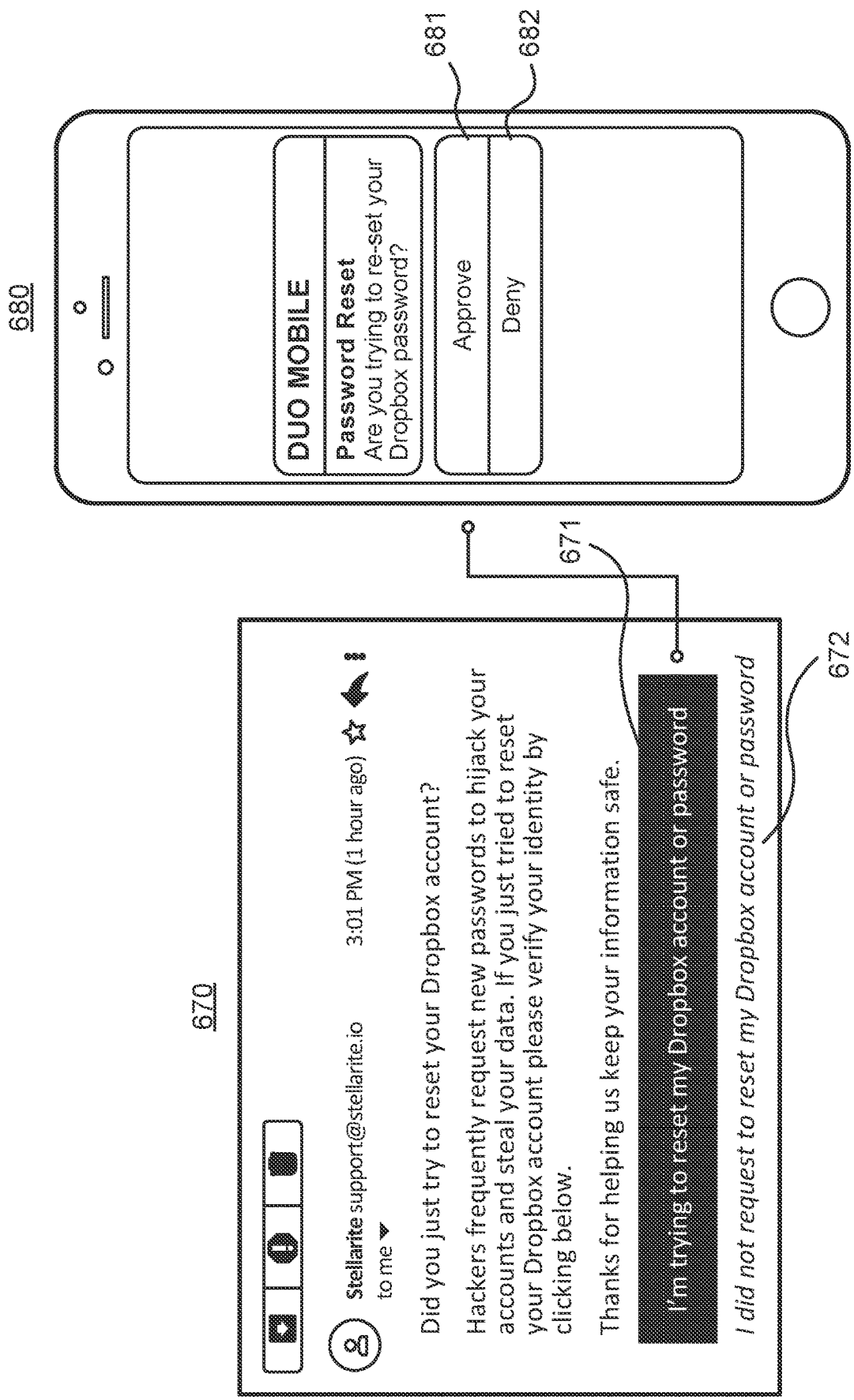
FIGS. 6A-6B illustrate exemplary embodiments of user interfaces for verifying authenticity of a suspicious electronic communication.
Figure 6B:
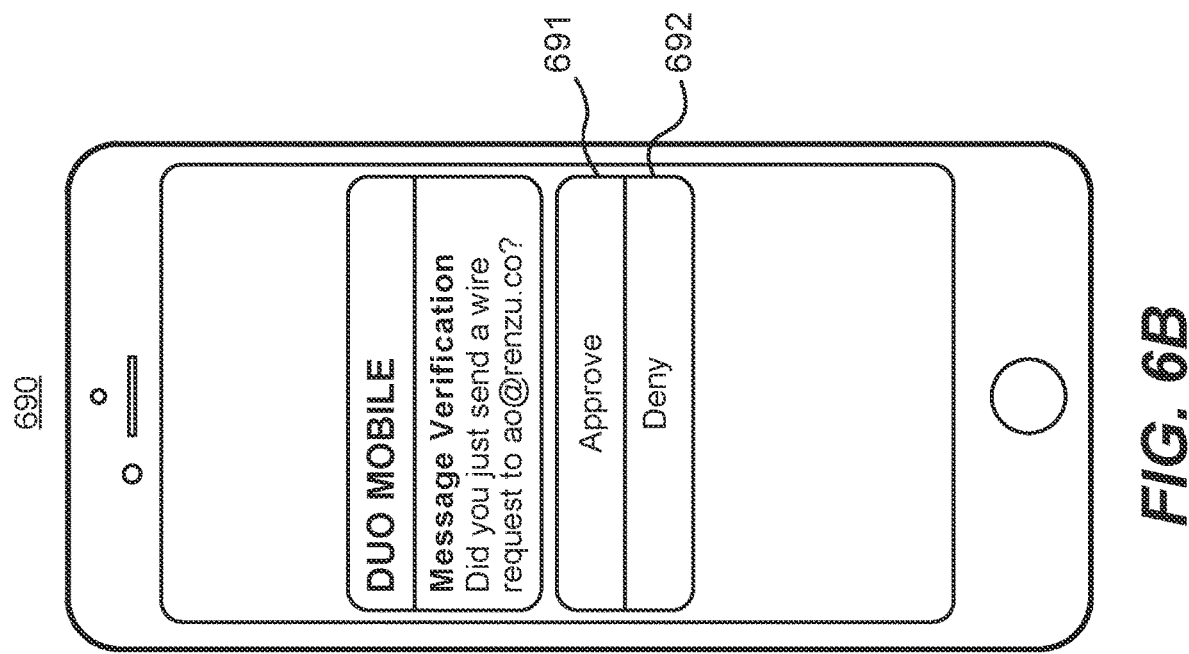

FIGS. 6A-6B illustrate exemplary embodiments of user interfaces for verifying authenticity of a suspicious electronic communication. FIG. 6A illustrates user interfaces 670 and 680, which show contents of verification messages sent to an intended recipient. User interface 670 illustrates exemplary contents of a verification message sent to an intended recipient, such as intended recipient 130. In this exemplary embodiment, the verification message is a message verifying whether a password reset request was requested by the intended recipient, however, the verification message may verify any scenario described herein. User interface 670 includes selectable option 671, which verifies the message (that is, in this case, the password reset request) as authentic, as well as selectable option 672, which, when selected, indicates that the message is not authentic (and is thus likely from a false originator, such as false originator 111, rather than from purported originator 110). Responsive to detecting a selection of selectable option 671, secure communications service 150 (or secure communications service instantiation 151) releases the message (e.g., from intercepted message purgatory 214, to a private repository of intended recipient 130).

Responsive to detecting a selection of selectable option 672, secure communications service 150 may refrain from releasing the message to intended recipient 130, and instead maintains the message (e.g., for further administrative activity), or deletes the message. However, because the private repository of the intended recipient may be compromised, alternatively, selection of selectable option 671 may cause secure communications service 150 to command an application on a client device (e.g., mobile device) of the intended recipient to push verification message 680 to the intended recipient. Verification message 680 includes selectable options 681 and 682, which mirror the functionality of selectable options 671 and 672, respectively. As yet another alternative, rather than require selection of selectable option 671 to reach verification message 680, secure communications service 150 may directly cause verification message 680 to be transmitted to the intended recipient, without using verification message 670 as an interstitial verification message.

FIG. 6B illustrates user interface 690, which show exemplary contents of verification messages sent to a purported originator. As depicted, user interface 690 prompts a purported originator (e.g., purported originator 110) to verify that the message was indeed sent by the purported originator. User interface 690 includes selectable options 691 and 692, which mirror the functionality of selectable options 671 and 672, respectively.

Figure 7A:
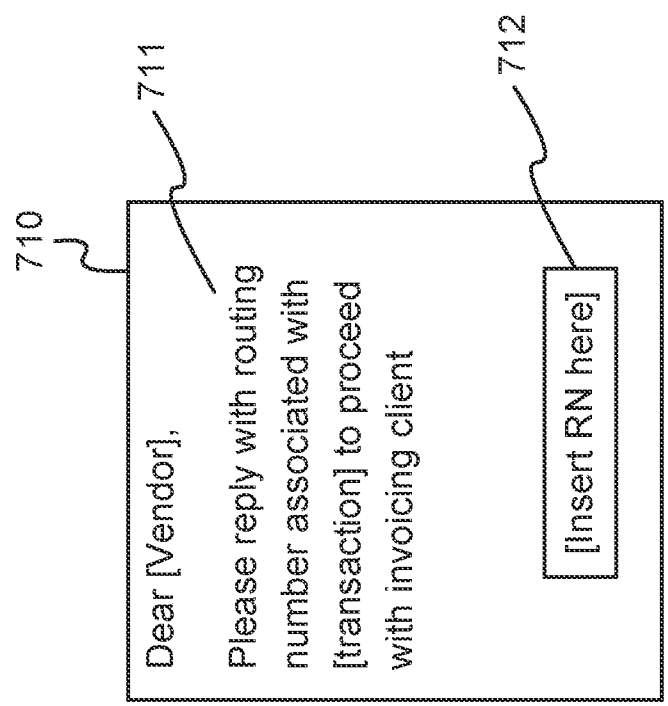
FIGS. 7A-7B illustrate exemplary embodiments of user interfaces for challenging an actual or purported originator to verify authenticity of an electronic communication.
Figure 7B:
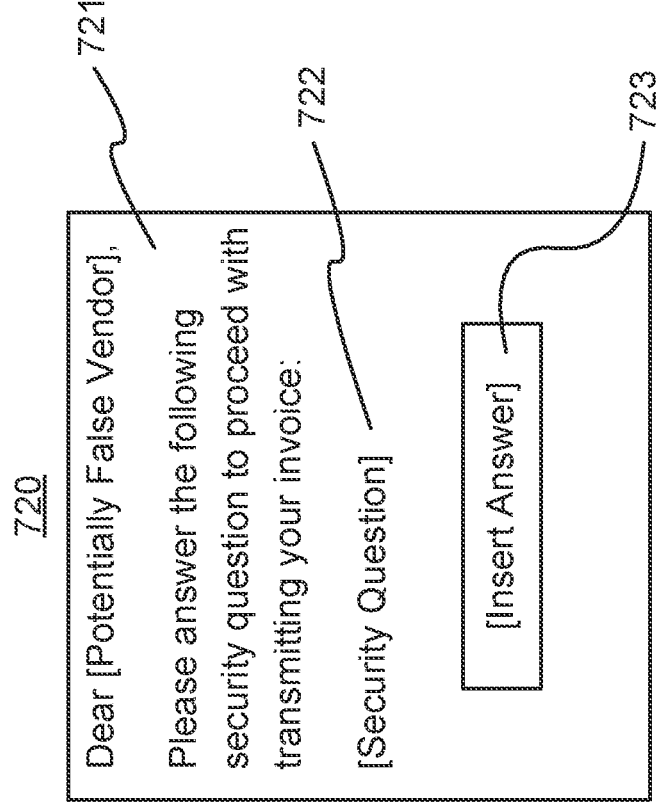

FIGS. 7A-7B illustrate exemplary embodiments of user interfaces for challenging an actual or purported originator to verify authenticity of an electronic communication. As shown in FIG. 7A, secure communications service 150 or secure communications service instantiation 151 transmits a verification message, whose contents 711 are depicted in user interface 710, to the purported originator of the initial message. For example, where a financial transaction is purported to be requested from a bank, and a trusted address is known of the bank, the secure communications service transmits the verification message to the bank to verify trusted information, such as a routing number associated with a transaction indicated by the initial message. The purported originator may input a symbol into the field (e.g., a collection of alphanumeric characters, and other characters). If the purported originator verifies the trusted information by correctly placing the requested information in field 712 (e.g., the input symbol matches a known symbol corresponding to the verification message, such as the routing number), then the initial message is verified and released to the intended recipient.

As shown in FIG. 7B, secure communications service 150 or secure communications service instantiation 151 transmits a verification message, whose contents 721 are depicted in user interface 720, to the originator of the initial message, which may be purported originator 110, or false originator 111. The verification message includes a challenge question 722. Reply field 723 includes a field where the answer to the challenge question may be input, though this is merely exemplary, and any other means of replying to the challenge question may be used (e.g., transmitting a reply message). Where a correct answer to the challenge question is received, the message is authenticated and it is determined that the challenged originator is in fact the purported originator. Where a false answer to the challenge question is received, the message is not authenticated and it may be determined that the challenged originator is in fact a false originator.

FIGS. 6A-B and FIGS. 7A-B are exemplary illustrations of verification messages, though they are not exhaustive. Other methods of verifying authenticity of a message may be used by the secure communications service. For example, in the scenario of FIG. 7B, the contents of verification message 721 may include a request for one or more references of users who can vouch for the authenticity of the recipient of verification message 721, and further verification messages may be transmitted to those references.

Exemplary Suspicious Message Interception and Authentication Data Flow

Figure 8:
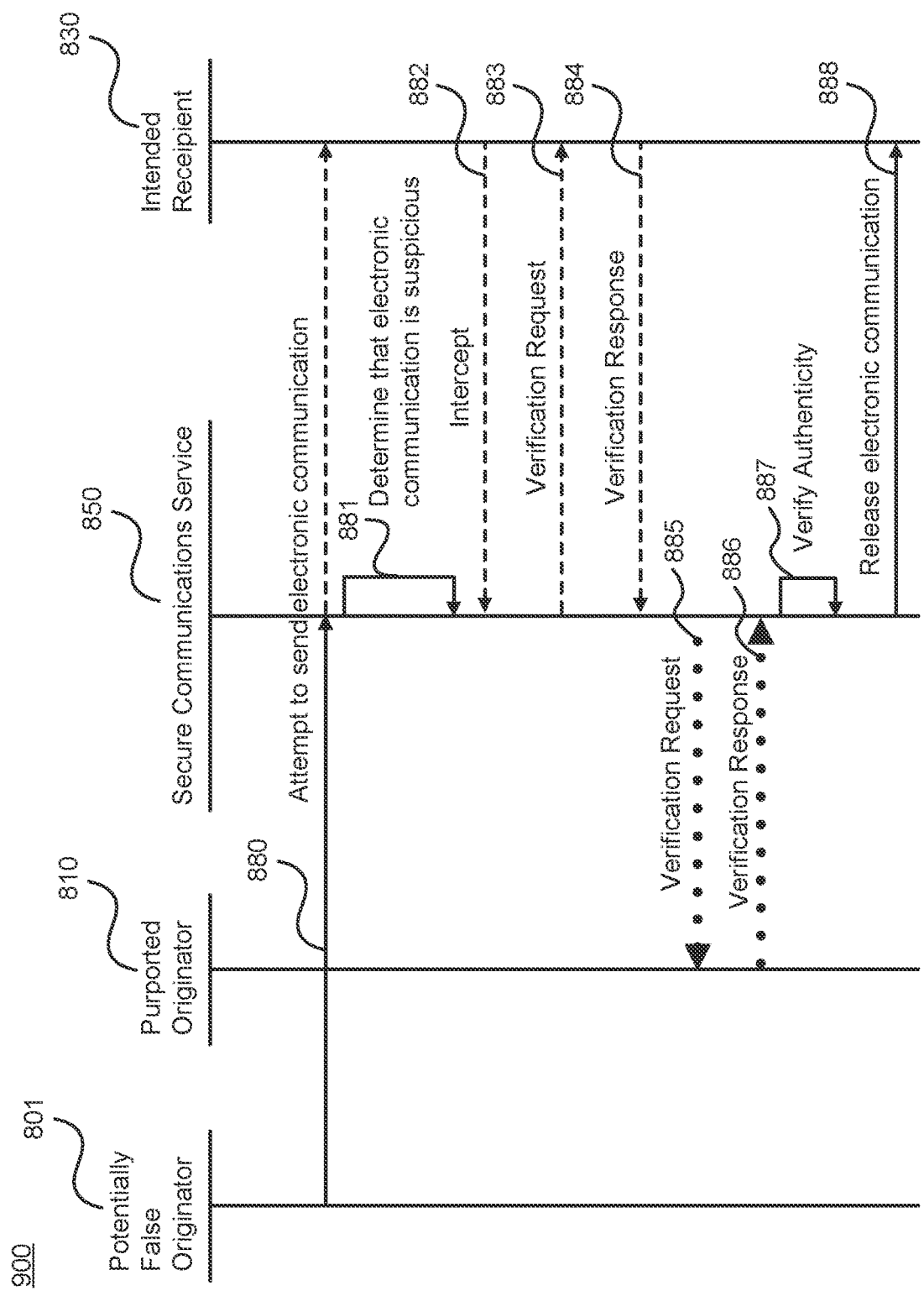
FIG. 8 illustrates one embodiment of an exemplary data flow for identifying, intercepting, and releasing a suspicious electronic communication.

FIG. 8 illustrates one embodiment of an exemplary data flow for identifying, intercepting, and releasing a suspicious electronic communication. Data flow 800 includes interactions between a potentially false originator 801, which may be the purported originator 810 or may be a false originator (e.g., false originator 111), secure communications service 850, and intended recipient 830. Each entity of data flow 800 has the same weight of description as described with respect to counterpart entities in environment 100 of FIG. 1. Data flow 800 begins with the potentially false originator 801 transmitting 880 an attempted electronic communication to intended recipient 830. During the attempt, secure communications service 850 inspects the electronic communication, and determines 881 that the electronic communication is suspicious (e.g., using suspicious communication detection module 202).

Secure communications service 850, based on the electronic communication being suspicious, intercepts 882 the electronic communication (e.g., using interception module 204. Secure communications service 850 then transmits a verification request to an entity, and receives a verification response from the entity (e.g., using backchannel verification module 206). For example, as depicted, secure communications service 850 may transmit 883 a verification request to intended recipient 830, and receive 884 a verification response from intended recipient 830. As another example, secure communications service 850 transmits 885 a verification request to purported originator 810, and receives 886 a verification response from purported originator 810. Other manners of transmission of verification messages disclosed herein (e.g., transmitting verification messages to a false originator, to references, etc.) may be used within data flow 800. Secure communications service 850 verifies 887 the authenticity of the verification response, and responsively releases 888 the electronic communication to a private repository of intended recipient 830.

Exemplary Challenge Flow for Verification Messages

Figure 9:
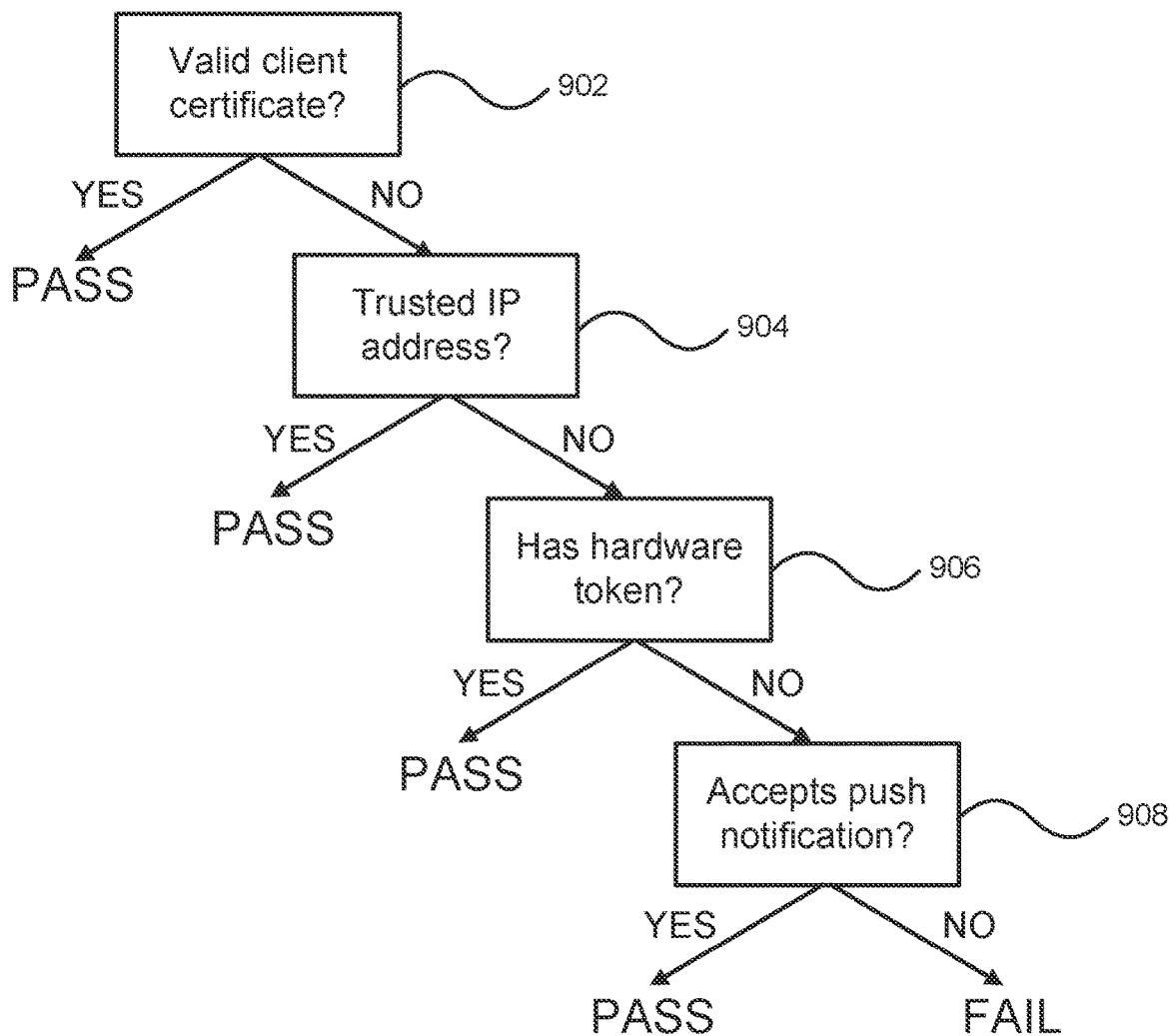
FIG. 9 illustrates one embodiment of an exemplary challenge flow for verifying the authenticity of an electronic communication.

FIG. 9 illustrates one embodiment of an exemplary challenge flow for verifying the authenticity of an electronic communication. The term challenge flow, as used herein, refers to a cascade of decisions that may be used by a secure communications service to determine whether to intercept and/or release an intercepted message transmitted from a purported originator to an intended recipient. Verification messages discussed above and below (e.g., as part of activity by suspicious communication detection module 202 and/or backchannel verification module 206) may be part of a challenge flow, rather than output in isolation. Challenge flow 900 is exemplary, and any element may be omitted or replaced by similar decisions. In an embodiment, as described above, a verification message may be inserted into a private repository of the recipient. Interaction with the inserted verification may not be fully trusted, because the private repository may be compromised. Thus, interaction with the verification message may initiate a verification protocol, which steps through a flow, such as challenge flow 900.

Challenge flow 900 begins with secure communications service 150 determining 902 whether a message indicates a valid client certificate of purported sender 110. If the purported certificate is included in the message, the message passes. The term pass, as used with respect to FIG. 9, refers to the message either not being considered suspicious by suspicious communication detection module 202, or being authenticated and released from verification database 216. The determination of a message passing may result in a reply message to a verification message being issued that verifies the authenticity of the message Where the client certificate is not valid, secure communications service 902 may determine 904 whether the message indicates a trusted IP address as an address of the purported originator. If the trusted IP address is determined, then the message passes. If not, then secure communications service 150 determines 906 whether the originator of the message has a hardware token that is known to correspond to the purported originator (e.g., based on entries of verification database 216). If the token is found, then the message passes. If the token is not found, then secure communications service 150 may transmit a push notification to an entity (e.g., the intended recipient or the purported originator) and may determine 908 whether the push notification is accepted (e.g., by a selection of selectable option 681). If the notification is accepted, the message passes. If not, and there are no further elements in the challenge flow, then the message fails and will not be released to the intended recipient.

Additional Configuration Considerations

The disclosed configurations provide an advantage of intercepting and validating electronic communications before they ever reach an intended recipient, thus ensuring that the intended recipient will not be harmed by phishing content or other damaging content from a false originator. Moreover, the disclosed configurations provide a benefit of enabling verification from either, or both, of the originator of the message and the intended recipient, thus providing a robust verification tool. Additionally, the disclosed configurations provide the advantage of using multiple modes of communicating with the intended recipient to minimize the chance that a compromised private repository would result in an intercepted message be errantly placed where it can cause danger to the intended recipient.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for intercepting and authenticating suspicious messages through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
 detecting, by a secure communications service, an electronic communication comprising an identifier of a purported originator of the electronic communication and an identifier of an intended recipient;
 determining, by the secure communications service, whether the electronic communication comprises a request for the intended recipient to perform an activity that corresponds to a suspicious attribute;
 in response to determining that the electronic communication comprises a request for the intended recipient to perform an activity that corresponds to a suspicious attribute:
  intercepting the electronic communication and storing the electronic communication in purgatory memory, so as to prevent the electronic communication from being populated in a private repository of the intended recipient;

determining a challenge recipient, the challenge recipient selected as one candidate recipient from a group of candidate challenge recipients based on content of the electronic communication, the group of candidate challenge recipients comprising the intended recipient and a trusted identifier of the purported originator; and transmitting a challenge to the challenge recipient that was selected from the group of candidate challenge recipients based on the content of the electronic communication;

receiving an indication that the challenge recipient has successfully verified the challenge, the challenge being successfully verified confirming legitimacy of the electronic communication; and in response to receiving the indication, releasing the electronic communication from the purgatory memory, so as to cause the electronic communication to be populated in the private repository of the intended recipient.

2. The method of claim 1, wherein determining that the electronic communication comprises a request for the intended recipient to perform an activity that corresponds to a suspicious attribute comprises:

determining whether content of the electronic communication matches a template of a template library comprising templates that indicate suspicious content;

in response to determining that the content of the electronic communication matches a template of the library, determining that the activity corresponds to the suspicious attribute;

in response to determining that the electronic communication does not match to a template of the library, determining a respective degree to which the electronic communication matches each respective template of the library;

determining whether a respective degree exceeds a threshold;

in response to determining that the respective degree exceeds the threshold, determining that the activity corresponds to the suspicious attribute; and in response to determining that the respective degree does not exceed the threshold, determining that the activity does not correspond to the suspicious attribute.

3. The method of claim 1, wherein determining that the electronic communication comprises a request for the intended recipient to perform an activity that corresponds to a suspicious attribute comprises determining that the electronic communication comprises a request for the intended recipient to perform an activity relating to at least one of password recovery, payment, account verification, affiliation verification, granting access privileges, and providing content.

4. The method of claim 1, wherein transmitting the challenge comprises transmitting a command to a device of the intended recipient to push a notification to the intended recipient that alerts the intended recipient of the challenge.

5. The method of claim 4, further comprising:

inputting into the private repository of the intended recipient an alert that a notification corresponding to the challenge is awaiting attention by the intended recipient at the device.

6. The method of claim 1, further comprising, responsive to receiving the indication but prior to releasing the electronic communication:

initiating a verification protocol; and releasing the electronic communication responsive to completion of execution of the verification protocol.

7. The method of claim 1, wherein the challenge recipient is the intended recipient, and wherein the method further comprises transmit a second challenge to a trusted identifier of the purported originator to verify authenticity of the electronic communication.

8. The method of claim 1, wherein determining the challenge recipient comprises:

querying a verification database with a query based on one or more attributes of the content of the electronic communication; and based on a result of the query, determining the challenge recipient.

9. A non-transitory computer-readable medium comprising memory with instructions encoded thereon that, when executed, cause one or more processors to perform operations, the instructions comprising instructions to:

detect, by a secure communications service, an electronic communication comprising an identifier of a purported originator of the electronic communication and an identifier of an intended recipient;

determine, by the secure communications service, whether the electronic communication comprises a request for the intended recipient to perform an activity that corresponds to a suspicious attribute;

in response to determining that the electronic communication comprises a request for the intended recipient to perform an activity that corresponds to a suspicious attribute:

intercept the electronic communication and storing the electronic communication in purgatory memory, so as to prevent the electronic communication from being populated in a private repository of the intended recipient;

determine a challenge recipient, the challenge recipient selected as one candidate recipient from a group of candidate challenge recipients based on content of the electronic communication, the group of candidate challenge recipients comprising the intended recipient and a trusted identifier of the purported originator; and transmit a challenge to the challenge recipient that was selected from the group of candidate challenge recipients based on the content of the electronic communication;

receive an indication that the challenge recipient has successfully verified the challenge, the challenge being successfully verified confirming legitimacy of the electronic communication; and in response to receiving the indication, release the electronic communication from the purgatory memory, so as to cause the electronic communication to be populated in the private repository of the intended recipient.

10. The non-transitory computer-readable medium of claim 9, wherein the instructions to determine that the electronic communication comprises a request for the intended recipient to perform an activity that corresponds to a suspicious attribute comprise instructions to:

determine whether content of the electronic communication matches a template of a template library comprising templates that indicate suspicious content;

in response to determining that the content of the electronic communication matches a template of the library, determine that the activity corresponds to the suspicious attribute;

in response to determining that the electronic communication does not match to a template of the library, determine a respective degree to which the electronic communication matches each respective template of the library;

determine whether a respective degree exceeds a threshold;

in response to determining that the respective degree exceeds the threshold, determine that the activity corresponds to the suspicious attribute; and in response to determining that the respective degree does not exceed the threshold, determine that the activity does not correspond to the suspicious attribute.

11. The non-transitory computer-readable medium of claim 9, wherein the instructions to determine that the electronic communication comprises a request for the intended recipient to perform an activity that corresponds to a suspicious attribute comprise instructions to determine that the electronic communication comprises a request for the intended recipient to perform an activity relating to at least one of password recovery, payment, account verification, affiliation verification, granting access privileges, and providing content.

12. The non-transitory computer-readable medium of claim 9, wherein the instructions to transmit the challenge comprise instructions to transmit a command to a device of the intended recipient to push a notification to the intended recipient that alerts the intended recipient of the challenge.

13. The non-transitory computer-readable medium of claim 12, the instructions further comprising instructions to:
input into the private repository of the intended recipient an alert that a notification corresponding to the challenge is awaiting attention by the intended recipient at the device.

14. The non-transitory computer-readable medium of claim 9, further comprising, responsive to receiving the indication but prior to releasing the electronic communication:
initiating a verification protocol; and
releasing the electronic communication responsive to completion of execution of the verification protocol.

15. The non-transitory computer-readable medium of claim 9, wherein the challenge recipient is the intended recipient, and wherein the instructions further comprise instructions to transmit a second challenge to a trusted identifier of the purported originator to verify authenticity of the electronic communication.

16. The non-transitory computer-readable medium of claim 9, wherein determining the challenge recipient comprises:
querying a verification database with a query based on one or more attributes of the content of the electronic communication; and
based on a result of the query, determining the challenge recipient.

17. A system comprising:
memory with instructions encoded thereon; and
one or more processors that, when executing the instructions, cause the system to perform operations comprising:
detecting, by a secure communications service, an electronic communication comprising an identifier of a purported originator of the electronic communication and an identifier of an intended recipient;
determining, by the secure communications service, whether the electronic communication comprises a request for the intended recipient to perform an activity that corresponds to a suspicious attribute;
in response to determining that the electronic communication comprises a request for the intended recipient to perform an activity that corresponds to a suspicious attribute:
intercepting the electronic communication and storing the electronic communication in purgatory memory, so as to prevent the electronic communication from being populated in a private repository of the intended recipient;
determining a challenge recipient, the challenge recipient selected as one candidate recipient from a group of candidate challenge recipients based on content of the electronic communication, the group of candidate challenge recipients comprising the intended recipient and a trusted identifier of the purported originator; and
transmitting a challenge to the challenge recipient that was selected from the group of candidate challenge recipients based on the content of the electronic communication;
receiving an indication that the challenge recipient has successfully verified the challenge, the challenge being successfully verified confirming legitimacy of the electronic communication; and
in response to receiving the indication, releasing the electronic communication from the purgatory memory, so as to cause the electronic communication to be populated in the private repository of the intended recipient.

18. The system of claim 17, wherein determining that the electronic communication comprises a request for the intended recipient to perform an activity that corresponds to a suspicious attribute comprises:
determining whether content of the electronic communication matches a template of a template library comprising templates that indicate suspicious content;
in response to determining that the content of the electronic communication matches a template of the library, determining that the activity corresponds to the suspicious attribute;
in response to determining that the electronic communication does not match to a template of the library, determining a respective degree to which the electronic communication matches each respective template of the library;
determining whether a respective degree exceeds a threshold;
in response to determining that the respective degree exceeds the threshold, determining that the activity corresponds to the suspicious attribute; and
in response to determining that the respective degree does not exceed the threshold, determining that the activity does not correspond to the suspicious attribute.

19. The system of claim 17, wherein transmitting the challenge comprises transmitting a command to a device of the intended recipient to push a notification to the intended recipient that alerts the intended recipient of the challenge.

20. The system of claim 17, wherein determining the challenge recipient comprises:

querying a verification database with a query based on one or more attributes of the content of the electronic communication; and based on a result of the query, determining the challenge recipient.

* * * * *